United States Patent [19]

McClure

[11] Patent Number: 4,722,468
[45] Date of Patent: Feb. 2, 1988

[54] BOILER PIPE TOOL FOR HELIARC WELDING WITH TONGUE AND GROOVE INTERLOCK

[76] Inventor: Gary W. McClure, Rte. 7, Box 228-A, South Charleston, W. Va. 25309

[21] Appl. No.: 843,615

[22] Filed: Mar. 25, 1986

Related U.S. Application Data

[63] Continuation-in-part of Ser. No. 574,624, Jan. 27, 1984, Pat. No. 4,579,272, which is a continuation-in-part of Ser. No. 400,134, Jul. 20, 1982, Pat. No. 4,493,139.

[51] Int. Cl.[4] .............................................. B23K 37/04
[52] U.S. Cl. ..................................... 228/49.3; 29/272; 29/282
[58] Field of Search ...................... 228/49.3; 285/419; 29/272, 282

[56] References Cited

U.S. PATENT DOCUMENTS 924,262  6/1909  Moll ..................................... 285/419

Primary Examiner—Gene P. Crosby
Assistant Examiner—Carmine Cuda
Attorney, Agent, or Firm—Fleit, Jacobson, Cohn & Price

[57] ABSTRACT

A tool for positioning and retaining boiler pipe sections in aligned, spaced relation and enabling the boiler pipe sections to be joined by heliarc welding which incorporates a split block having opposed recesses therein which cooperate to define a passageway for receiving the adjacent ends of boiler pipe sections to retain the boiler pipe sections in alignment. The two split block components are slidably interlocked by a tongue and groove connection and spacers are provided in the tool for engaging adjacent end of boiler pipe sections to retain the pipe sections in aligned and spaced relation. Each of the split block components includes access openings which enable access to opposite surfaces of the opposed ends of the boiler pipe sections to enable heliarc welding of a portion of the adjacent ends of the boiler pipe sections. An over-center pulling device is provided to pull the boiler pipe sections into aligned adjacent relation so that the split block can be assembled onto adjacent boiler pipe sections.

9 Claims, 6 Drawing Figures

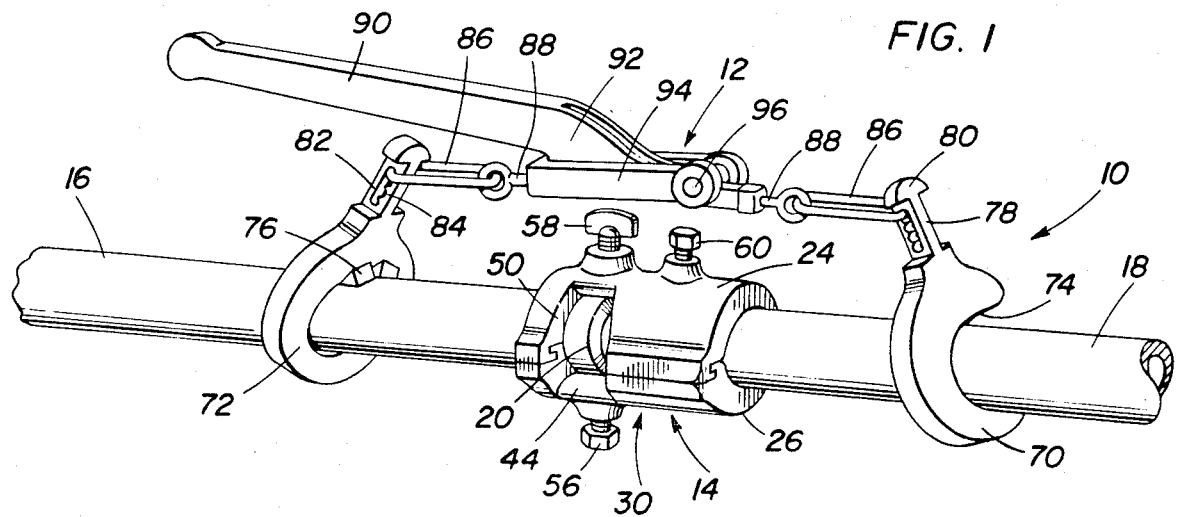
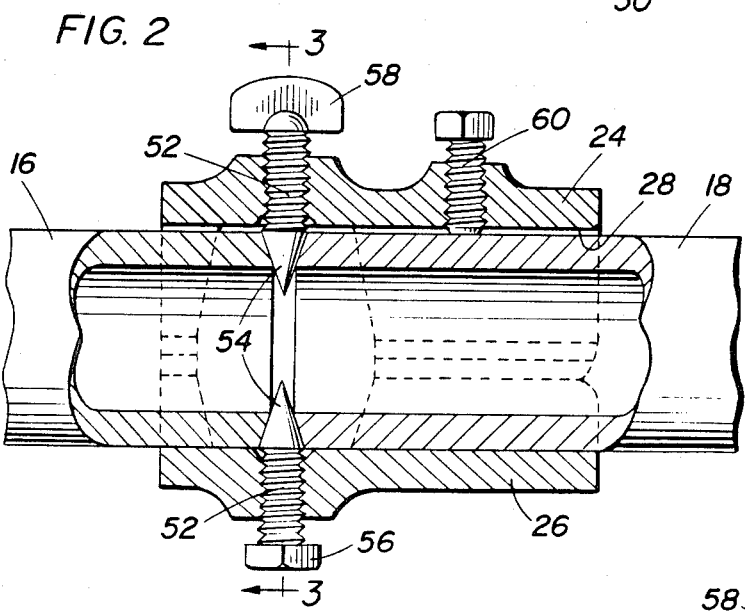
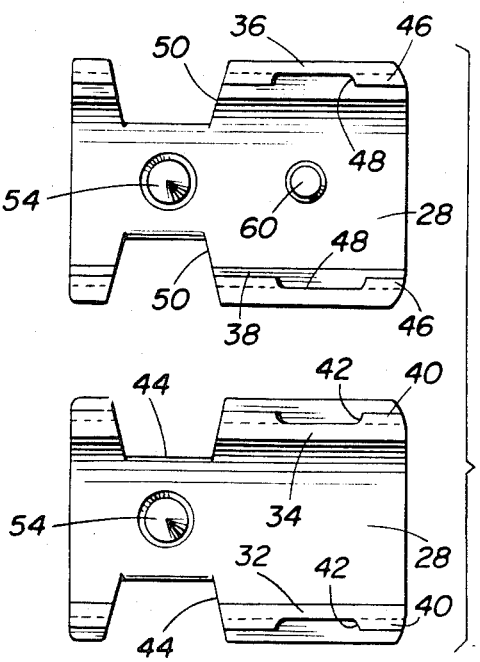
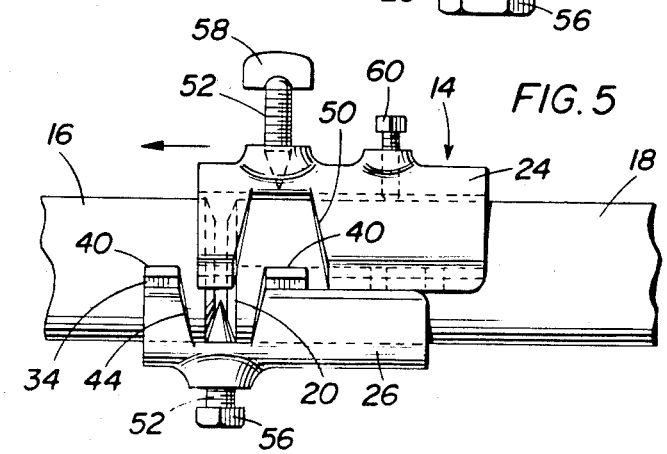
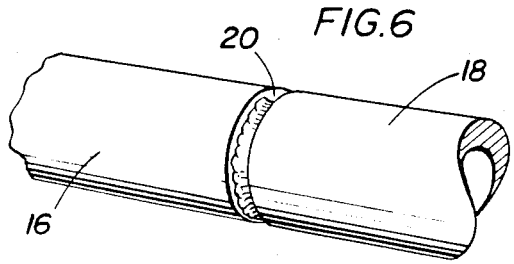

BOILER PIPE TOOL FOR HELIARC WELDING WITH TONGUE AND GROOVE INTERLOCK

CROSS-REFERENCE TO RELATED APPLICATIONS

This application is a continuation-in-part of my copending application Ser. No. 574,624, filed Jan. 27, 1984 for BOILER PIPE TOOL FOR HELIARC WELDING now U.S. Pat. No. 4,579,272 issued Apr. 1, 1986 which was a continuation-in-part of Ser. No. 400,134, filed July 20, 1982 for BOILER PIPE ASSEMBLY TOOL now U.S. Pat. No. 4,493,139, issued Jan. 15, 1985.

BACKGROUND OF THE INVENTION

1. Field of the Invention

The present invention generally relates to a tool for positioning and retaining boiler pipe sections in aligned, spaced relation and enabling the boiler pipe sections to be joined by heliarc welding which incorporates a split block having opposed recesses therein which cooperate to define a passageway for receiving the adjacent ends of boiler pipe sections to retain the boiler pipe sections in alignment. The two split block components are slidably interlocked by a tongue and groove connection and spacers are provided in the tool for engaging adjacent ends of boiler pipe sections to retain the pipe sections in aligned and spaced relation. Each of the split block components includes access openings which provide access to the opposed ends of the boiler pipe sections to enable heliarc welding of a portion of the adjacent ends of the boiler pipe sections. An over-center pulling device is provided to pull the boiler pipe sections into aligned adjacent relation so that the split block can be assembled onto adjacent boiler pipe sections.

2. Information Disclosure Statement

The prior art cited in the aforementioned copending application and U.S. Pat. No. 4,493,139 are made of record herein.

SUMMARY OF THE INVENTION

An object of the present invention is to provide a tool to facilitate the heliarc welding of adjacent ends of boiler pipe sections which includes an alignment and spacing block bridging the juncture between adjacent boiler pipe sections and a pulling tool to pull the adjacent pipe sections into aligned adjacent relation with the aligning and spacing block being in the form of a split block having oppositely facing generally semi-cylindrical recesses to engage and receive peripheral portions of adjacent boiler pipe sections with the block being split longitudinally and secured together by a tongue and groove sliding interlocking connection to enable assembly of the block onto the pipe sections with the recesses in the components of the block cooperating to engage the circumference of the boiler pipe sections.

Another object of the invention is to provide a tool in accordance with the preceding object in which the components of the block each have an adjustable spacer engaging the chamfered ends of the boiler pipe sections to enable the space between the adjacent ends of the boiler pipe sections to be varied so that optimum spatial relationship may be obtained for more effective utilization of the heliarc welding process to connect the boiler pipe sections together without depositing welding material interiorly of the pipe sections and without causing any flow restrictions in the pipe sections.

A further object of the invention is to provide a tool in accordance with the preceding objects in which one of the components of the split block is provided with a setscrew to secure the assembled block in position in bridging relation to adjacent ends of boiler pipe sections.

Still another object of the invention is to provide a tool in accordance with the preceding objects which is simple in construction, easy to use, effectively used in restricted areas interiorly of boilers and the like and reduces the time required in heliarc welding boiler pipe sections.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the tool of the present invention illustrating the assembly of the pulling tool with the adjacent boiler pipe sections and the aligning and spacing block with the adjacent boiler pipe sections.

FIG. 2 is a longitudinal, sectional view, on an enlarged scale, illustrating the structural details of the block and the adjustable spacer members mounted thereon.

FIG. 3 is a transverse sectional view taken on section line 3—3 on FIG. 2 illustrating the tongue and groove interlocking connection between the components of the split block and the association of the spacer members with the block.

FIG. 4 is a top plan view of the two components of the split block, one of which has been inverted.

FIG. 5 is a side elevational view of the block in partially assembled relation.

FIG. 6 is a perspective view illustrating adjacent ends of boiler pipe sections partially joined by heliarc welding.

DESCRIPTION OF THE PREFERRED EMBODIMENT

Referring now specifically to the drawings, the tool of the present invention is generally designated by the numeral 10 and includes a pulling tool 12 and a spacing and aligning block 14 for aligning and connecting adjacent boiler pipe sections 16 and 18 in rigid alignment to enable replacement, repair and the like of boiler pipes interiorly of a boiler shell and the like. As illustrated, the adjacent ends of the boiler pipe sections 16 and 18 are bevelled or chamfered as at 20 in the conventional manner as disclosed in my copending application.

The spacing and alignment block 14 includes a pair of block members or components 24 and 26 each of which are generally semi-cylindrical in configuration and provided with a generally semi-cylindrical recess 28 with the components 24 and 26 being connected by a tongue and groove interlocking connection generally designated by the numeral 30 so that when the two components 24 and 26 are assembled, the recesses 28 form generally a cylindrical passageway for receiving the adjacent ends of the pipe sections 16 and 18 as illustrated in FIG. 2.

The tongue and groove connection 30 includes a longitudinal projection 32 and 34 along the inner edge of each edge of the block component 26 and longitudinal projections 36 and 38 on the block component 24 which are oriented along the outer edge of each edge of the block component 24. As illustrated in FIGS. 3 and 4, the projections 32 and 34 each include outwardly extending projections 40 which are longitudinally elongated but are spaced apart by omitted portions 42. The omitted portions in each of the projections 32 are defined by an enlarged access opening 44 both of which are located adjacent one end of the block component 26.

The block component 24 includes segmental inturned lips or projections 46 defined by omitted portions 48 with the omitted portions in each of the projections 36 being defined by an enlarged access opening 50 with the access openings 44 and 50 being aligned and registered with each other when the alignment block 14 is completely assembled to provide access to opposed side portions of the chamfered ends 20 of adjacent boiler pipe sections 16 and 18 to enable heliarc welding of peripheral portions of the ends of the pipe sections. This arrangement enables the block components 24 and 26 to be assembled around adjacent pipe sections 16 and 18 as illustrated in FIG. 5 so that the omitted portions 42 and 48 of the projections 40 and 46 will receive the respective outturned projections 40 and inturned projections 46 with the block component 24 being misaligned with the block component 26 during assembly of these components so that relative longitudinal movement of the block component 24 in the direction indicated by the arrow in FIG. 5 will cause interlocking engagement between the components 24 and 26 and arrange these components in aligned relation as illustrated in FIGS. 1 and 2. Each of the block components 24 and 26 is provided with a screw threaded spacer 52 having having a conical tapered inner end 54 which engages the chamfered ends 20 of the boiler pipe sections 16 and 18. The outer end of the spacers 52 are provided with a polygonal end 56 for receiving a wrench or a transverse flange 58 forming a T head to enable screw threaded manipulation of the spacers 52 to adjustably space the chamfered ends 20 of the boiler pipe sections 16 and 18.

The component 24 of the block 14 includes a setscrew 60 spaced from the spacers 52 to adjustably lock the alignment block 14 to the boiler pipe section 18 having a longer extent telescoped into the block 14 as illustrated in FIG. 2 thereby providing a rigid, aligned and spaced relationship between the boiler pipe sections 16 and 18.

The pulling tool 12 is the same as that disclosed in the above mentioned copending application and includes a pair of substantially C-shaped pipe engaging members 70 and 72 each of which is provided with a lateral opening 74 to enable it to be placed laterally onto the pipe sections 16 and 18 with gripping inserts 76 being provided to grippingly engage and bite into the pipe sections. Each of the C-shaped members 70 and 72 includes an upwardly extending shank 78 having an enlarged head 80 thereon to facilite handling and a slot 82 with notches 84 provided therein for adjustably receiving one end of an elongated chain link 86 which has its other end attached to an eye member 88 with one of the eye members 88 being connected to one end of an elongated handle 90 which has an offset end portion 92 pivotally attached to a U-shaped yoke 94 by a pivot pin 96 with the other end of the yoke 94 being connected to the other eye 88 so that when the handle 90 is swung in one direction, the chain links 86 will be moved apart and when the handle is moved in the other direction, as in FIG. 1, the chain links will be pulled together with the pivot axis 96 passing over a line extending between the points of connection with the chain links in the manner disclosed in my copending application.

The pulling tool 12 is used to pull the boiler pipe sections 16 and 18 together and to bring them into alignment with the block 14 securing the ends of the pipe sections 16 and 18 in accurate alignment and accurate spaced relation with adjustment of the screw threaded spacers 52 providing adjustment of the space between the chamfered ends of the pipe sections. The access openings 44 and 50 provide access to both or either side of the Pipe sections to enable the heliarc welding process to commence adjacent the conical ends 54 of the spacers 52 so that the block 14 may be removed after partial completion of the heliarc welding process to enable completion of the heliarc welding process about the circumference of the pipe sections. The use of the tongue and groove slidable interlocking connection eliminates the necessity of using bolts to secure the block components together which requires time and manipulation of wrenches and wear on the bolts during repeated use is eliminated. This arrangement enables the components of the block to be quickly and easily assembled in relation to the pipe sections when the pulling tool is used to pull the pipe sections together and into alignment with each other thereby greatly increasing the efficiency of the welding process for connecting the adjacent pipe sections 16 and 18.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A boiler pipe tool comprising a pulling device for engaging and pulling adjacent boiler pipe sections into adjacent aligned relation to enable adjacent ends thereof to be connected by welding, and a spacing and an aligning block engaging the adjacent ends of adjacent boiler pipe sections and retaining them accurately in aligned and closely spaced relation to enable the adjacent ends of the pipe sections to be heliarc welded, said block including two block members, means detachingly securing the two block members together in complete encircling relation to the adjacent boiler pipe sections, each block member including a partial cylindrical recess receiving the periphery of adjacent boiler pipe sections in bridging relation to adjacent ends thereof for retaining the boiler pipe sections in alignment in such a manner that a portion of the adjacent ends of the boiler pipe sections are accessible for welding, each of said block members including a spacing member for positioning between adjacent ends of adjacent boiler pipe sections for spacing the pipe sections adjustably from each other, said means detachably securing the block members together including a sliding interlocking connection along both edges to enable connection without the use of external fastening devices.

2. The tool as defined in claim 1 wherein the adjacent ends of the boiler pipe sections are bevelled for receiving the spacer members, said spacer members including a tapered inner end and a screw threaded portion for radial adjustment.

3. The tool as defined in claim 2 wherein each of said block members includes a lateral access opening adjacent one end thereof to provide access to the adjacent ends of the boiler pipe sections, one of said block members including a setscrew to lock the block in bridging relation to the boiler pipe sections.

4. The tool as defined in claim 3 wherein said means slidingly interconnecting the block members includes corresponding and interengaging segmental tongue and groove projections and recesses on the edges of the block members for interfitting engagement and longitudinal sliding interlocking engagement.

5. The tool as defined in claim 4 wherein each of said block members are substantially semi-cylindrical in configuration with the segmental tongue and groove projections and recesses being oriented along longitudinal side edges of the block members to form a line of separation generally at the center line of the boiler pipe sections.

6. The tool as defined in claim 1 wherein said means slidably interconnecting the block members includes corresponding and interengaging segmental tongue and groove projections and recesses on the edges of the block members for interfitting engagement and longitudinal sliding interlocking engagement.

7. The tool as defined in claim 6 wherein each of said block members are substantially semi-cylindrical in configuration with the segmental tongue and groove projections and recesses being oriented along longitudinal side edges of the block members to form a line of separation generally at the center line of the boiler pipe sections.

8. A pipe tool comprising an aligning block engaging the adjacent ends of adjacent pipe sections and retaining them accurately in aligned and closely spaced relation to enable the adjacent ends of the pipe section to be welded, said block including two block members, means detachingly securing the two block members together in complete encircling relation to the adjacent pipe sections, each block member including a partial cylindrical recess receiving the periphery of adjacent pipe sections in bridging relation to adjacent ends thereof for retaining the pipe sections in alignment in such a manner that a portion of the adjacent ends of the pipe sections are accessible for welding, each of said block members including a spacer for positioning between adjacent ends of adjacent pipe sections for spacing the pipe sections adjustably from each other, said means detachably securing the block members together including a sliding interlocking connection to enable connection along both edges without the use of external fastening devices.

9. The tool as defined in claim 8 wherein each of said block members includes an access opening in each longitudinal edge, said openings being disposed adjacent one end of the block members and in circumferential alignment with said spacers to provide access to opposite portions of the periphery of adjacent ends of the pipe sections.

* * * * *